US009800947B2

(12) United States Patent
Toba

(10) Patent No.: US 9,800,947 B2
(45) Date of Patent: Oct. 24, 2017

(54) TRANSMISSION APPARATUS, TRANSMISSION METHOD, AND CABLE

(71) Applicant: SONY CORPORATION, Tokyo (JP)

(72) Inventor: Kazuaki Toba, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/643,103

(22) Filed: Mar. 10, 2015

(65) Prior Publication Data

US 2015/0271569 A1  Sep. 24, 2015

(30) Foreign Application Priority Data

Mar. 19, 2014 (JP) .................. 2014-055853

(51) Int. Cl.
*H04N 21/61* (2011.01)
*H04N 21/647* (2011.01)
*H04L 25/00* (2006.01)
*H04N 7/10* (2006.01)

(52) U.S. Cl.
CPC ....... *H04N 21/64761* (2013.01); *H04L 25/00* (2013.01); *H04N 7/10* (2013.01); *H04N 21/615* (2013.01); *H04N 21/6118* (2013.01); *H04N 21/6168* (2013.01); *H04N 21/64738* (2013.01)

(58) Field of Classification Search
CPC ......... H04N 21/41407; H04N 21/4384; H04N 21/6131; H04N 21/631; H04N 21/6408; H04N 7/17318; H04L 65/80; H04L 69/14
See application file for complete search history.

(56) References Cited

U.S. PATENT DOCUMENTS

| | | | | |
|---|---|---|---|---|
| 8,495,691 B1* | 7/2013 | Kondapalli | ............ | H04N 21/25 725/107 |
| 2002/0174337 A1* | 11/2002 | Aihara | .................... | G06F 21/78 713/172 |
| 2003/0236843 A1* | 12/2003 | Weber | .............. | H04N 21/23424 709/206 |
| 2005/0047350 A1* | 3/2005 | Kantor | .................... | H04L 41/12 370/254 |
| 2007/0083905 A1* | 4/2007 | Lee | ......................... | G09G 5/006 725/105 |
| 2007/0260788 A1* | 11/2007 | Blinick | ............... | G06F 13/4081 710/100 |
| 2008/0046922 A1* | 2/2008 | Jankins | ............ | H04N 21/64322 725/35 |
| 2008/0155094 A1* | 6/2008 | Roese | ................. | H04L 63/0492 709/224 |
| 2008/0249961 A1* | 10/2008 | Harkness | ......... | H04N 21/23892 705/400 |
| 2009/0138493 A1* | 5/2009 | Kalaboukis | ....... | G06F 17/30017 |

(Continued)

FOREIGN PATENT DOCUMENTS

JP       2013-026686 A       2/2013

*Primary Examiner* — Randy Flynn
(74) *Attorney, Agent, or Firm* — Chip Law Group

(57) ABSTRACT

A transmission apparatus includes a transmission unit configured to transmit content to an external apparatus through a cable; an information acquisition unit configured to acquire cable-length information that represents a cable length to the external apparatus; and a controller configured to control an operation of the transmission unit based on the cable-length information acquired by the information acquisition unit.

11 Claims, 7 Drawing Sheets

(56) References Cited

U.S. PATENT DOCUMENTS

| | | | |
|---|---|---|---|
| 2010/0073560 A1* | 3/2010 | Kitano | H04N 21/43632 348/554 |
| 2010/0142902 A1* | 6/2010 | Lapp | H01B 7/368 385/101 |
| 2012/0229706 A1* | 9/2012 | Kabuto | H04N 21/43635 348/723 |
| 2012/0309515 A1* | 12/2012 | Chung | H04N 21/274 463/31 |
| 2014/0119425 A1* | 5/2014 | Boccaccio | G09G 5/006 375/232 |

* cited by examiner

| | Bit 7 | Bit 6 | Bit 5 | Bit 4 | Bit 3 | Bit 2 | Bit 1 | Bit 0 |
|---|---|---|---|---|---|---|---|---|
| Cable-length data (add=0xXX) | Not coded (1: coded) | Coded cable length (m) | | | | | | |
| Public key data (add=0xYY) | Public key data [1047:1040] | | | | | | | |
| | ... | | | | | | | |
| | Public key data [7:0] | | | | | | | |
| Signature data (add=0xZZ) | Signature data [3071: 3064] | | | | | | | |
| | ... | | | | | | | |
| | Signature data [7:0] | | | | | | | |

FIG.8

Content cannot be reproduced because wrong cable may be used or transmission distance may exceed distance accepted by content.

FIG.9

TRANSMISSION APPARATUS, TRANSMISSION METHOD, AND CABLE

CROSS REFERENCE TO RELATED APPLICATIONS

This application claims the benefit of Japanese Priority Patent Application JP 2014-055853 filed Mar. 19, 2014, the entire contents of which are incorporated herein by reference.

BACKGROUND

The present disclosure relates to a transmission apparatus, a transmission method, and a cable, and particularly to a transmission apparatus or the like that transmits content such as video and audio to an external apparatus through a cable.

Much of copyrighted content can be transmitted only for family use. In the past, transmission of content in wired connection such as IP transmission has been possible up to 100 m to meet the standards, and actually, it has been technically difficult to perform long-distance transmission of 100 m or more. Moreover, in wireless connection in which the connection mode is not visible and it is hard to limit the distance, there exists a method of achieving copyright protection by measuring a distance between apparatuses as round trip time (RTT) to estimate the distance and the number of repeaters, for example (see Japanese Patent Application Laid-open No. 2013-026686).

In recent years, an optical interface has been proposed as a technique to connect apparatuses to each other for achieving transmission of high-capacity data. This technique is expected to significantly improve the degradation of a transmission signal due to the long transmission distance as compared with the existing interface standards, and it may be possible to perform long-distance transmission of more than the distance limit. In this case, because the interface can perform high-capacity transmission at a high speed, it is technically very difficult to accurately measure the RTT. When such an interface technique is used to transmit copyrighted content, it may be impossible to limit the distance between the apparatuses to the distance corresponding to family use.

SUMMARY

It is desirable to satisfactorily achieve copyright protection of content.

According to an embodiment of the present disclosure, there is provided a transmission apparatus including a transmission unit configured to transmit content to an external apparatus through a cable, an information acquisition unit configured to acquire cable-length information that represents a cable length to the external apparatus, and a controller configured to control an operation of the transmission unit based on the cable-length information acquired by the information acquisition unit.

In this embodiment, content is transmitted to the external apparatus through the cable by the transmission unit. It should be noted that examples of the content include video data and audio data. The information acquisition unit acquires the cable-length information that represents the cable length to the external apparatus.

Moreover, for example, the information acquisition unit may be configured to acquire cable-length information that represents a sum of cable lengths of cables in a case where a predetermined number of repeaters exist between the transmission apparatus and the external apparatus. In this case, for example, the information acquisition unit may be configured to acquire the cable-length information that represents the sum of the cable lengths of the cables by requesting cable-length information that represents a cable length on a side of the external apparatus from each of the predetermined number of repeaters to acquire the requested cable-length information. In this case, the information acquisition unit may be configured to calculate the number of apparatuses on a path based on an address, and to determine whether or not a repeater exists between the transmission apparatus and the external apparatus.

The controller controls the operation of the transmission unit based on the cable-length information acquired by the information acquisition unit. For example, the controller may be configured to limit transmission of the content from the transmission unit when the cable-length information is not acquired by the information acquisition unit or when the cable length indicated by the cable-length information acquired by the information acquisition unit exceeds a distance limit. In this case, for example, the distance limit may be included in the content as one of copyright protection information. In this case, for example, the distance limit may be set by a user.

In this case, for example, the controller may be configured to control the transmission unit not to transmit the content when the cable-length information is not acquired by the information acquisition unit or when the cable length indicated by the cable-length information acquired by the information acquisition unit exceeds the distance limit. In this case, for example, the controller may be configured to control the transmission unit to transmit content with decreased quality when the cable-length information is not acquired by the information acquisition unit or when the cable length indicated by the cable-length information acquired by the information acquisition unit exceeds the distance limit. In this case, for example, the transmission unit may be configured to transmit image data to the external apparatus through the cable when the transmission of the content is limited, the image data informing that the transmission of the content is limited.

As described above, in this embodiment, the cable-length information that represents the cable length to the external apparatus is acquired, and the operation of transmitting content is controlled based on the cable-length information. According to this embodiment, it is possible to easily and reliably achieve copyright protection of content that can be transmitted only for family use, for example.

Moreover, according to another embodiment of the present disclosure, there is provided a cable including a memory including a plug having cable-length information stored therein.

The cable according this embodiment includes a memory including a plug having cable-length information stored therein. For example, the cable-length information stored in the memory may be encrypted, and the memory may further store public key information for decrypting the cable-length information. For example, information stored in the memory may be taken out through an electrical lead. Moreover, for example, information stored in the memory may be taken out through wireless communication.

As described above, in this embodiment, a cable includes a memory including a plug having cable-length information stored therein. For example, a transmission apparatus used with this cable connected thereto can easily achieve the cable-length information, and it is possible to easily and reliably achieve copyright protection of content that can be transmitted only for family use based on the acquired cable-length information.

According to the present disclosure, it is possible to satisfactorily achieve copyright protection of content. It should be noted that the effect described herein is not necessarily restrictive, and additional effects may be provided.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 8 is a diagram showing an example of information stored in the memory;

FIG. 9 is a diagram showing an example of an informing screen in the case where transmission of content is limited;

DETAILED DESCRIPTION OF EMBODIMENTS

Hereinafter, an embodiment for carrying out the present disclosure (hereinafter, referred to as embodiment) will be described. It should be noted that a description will be made in the following order.
1. Embodiment
2. Modified example
  1. Embodiment)
(Configuration Example of Content Transmission System)

Figure 1A:
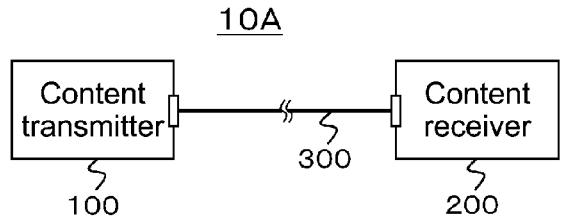
FIGS. 1A and 1B are each a block diagram showing a configuration example of a content transmission system according to an embodiment of the present disclosure.

FIG. 1A shows a configuration example of a content transmission system 10A. The content transmission system 10A is configured by a content transmitter 100 and a content receiver 200 connected through a cable 300. In this embodiment, the cable 300 is an optical communication cable. In the content transmission system 10A, content is taken out from the content transmitter 100, and is transmitted to the content receiver 200 through the cable 300. Then, an image of the content is displayed or sound of the content is output.

Figure 1B:
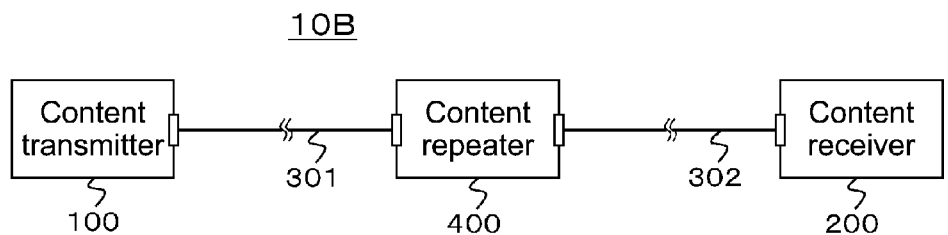

On the other hand, FIG. 1B shows a configuration example of a content transmission system 10B. The content transmission system 10B is configured by the content transmitter 100 and the content receiver 200 connected through a cable 301, a repeater 400, and a cable 302. In this embodiment, the cables 301 and 302 are optical communication cables. In the content transmission system 10B, content is taken out from the content transmitter 100, and is transmitted to the content receiver 200 through the cable 301, the content repeater 400 and the cable 302. Then, an image of the content is displayed or sound of the content is output.

Figure 2:
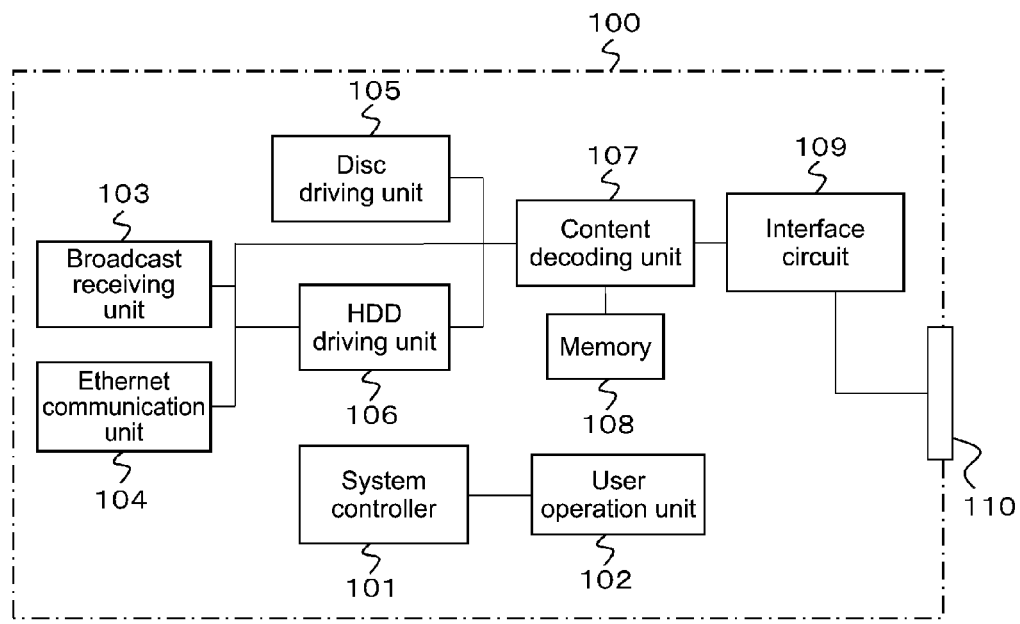
FIG. 2 is a block diagram showing a configuration example of a content transmitter.

FIG. 2 shows a configuration example of a content transmitter. The content transmitter 100 includes a system controller 101, a user operation unit 102, a broadcast receiving unit 103, an Ethernet communication unit 104, a disc driving unit 105, an HDD driving unit 106, a content decoding unit 107, a memory 108, an interface circuit 109, and an output port 110. It should be noted that "Ethernet" is a registered trademark.

The system controller 101 is configured to control the operation of each unit of the content transmitter 100. The user operation unit 102 is connected to the system controller 101. The user operation unit 102 constitutes a user interface. The broadcast receiving unit 103 is configured to acquire content from broadcast waves of digital broadcasting, satellite broadcasting, cable television broadcasting, or the like. The Ethernet communication unit 104 is configured to acquire content through an Ethernet connection. The disc driving unit 105 is configured to acquire content from a disc (not shown).

The HDD driving unit 106 is configured to temporarily store content acquired by the broadcast receiving unit 103 or the Ethernet communication unit 104 in an HDD storage apparatus (not shown) connected to the HDD driving unit 106. Moreover, the HDD driving unit 106 is configured to read the content stored in the HDD storage apparatus, and to transmit the read content to the content decoding unit 107.

The content decoding unit 107 is configured to use the memory 108 as a work area to perform a decoding process on content acquired by the broadcast receiving unit 103, the Ethernet communication unit 104, or the disc driving unit 105, or content read by the HDD driving unit 106 from the HDD storage apparatus, and to acquire baseband (non-compressed) video data and audio data. The interface circuit 109 is configured to convert video data or audio data acquired by the content decoding unit 107 into a signal for transmission (optical interface signal), and to transmit the converted data to the output port 110.

Figure 3:
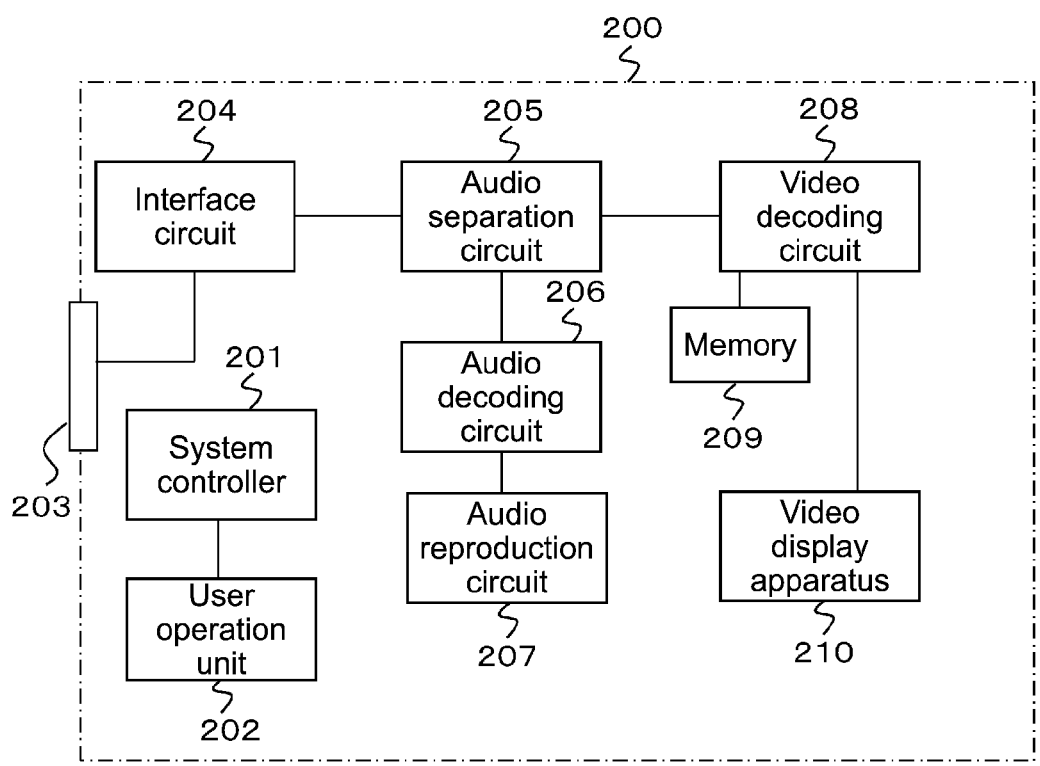
FIG. 3 is a block diagram showing a configuration example of a content receiver.

FIG. 3 shows a configuration example of a content receiver. The content receiver 200 includes a system controller 201, a user operation unit 202, an input port 203, an interface circuit 204, an audio separation circuit 205, an audio decoding circuit 206, an audio reproduction circuit 207, a video decoding circuit 208, a memory 209, and a video display apparatus 210.

The system controller 201 is configured to control the operation of each unit of the content receiver 200. The user operation unit 202 is connected to the system controller 201. The user operation unit 202 constitutes a user interface. The interface circuit 204 is configured to receive a signal for transmission (optical interface signal) input to the input port 203, and to convert the received optical signal into an electric signal. The audio separation circuit 205 is configured to separate coded audio data from the signal for transmission.

The audio decoding circuit 206 is configured to perform a decoding process on the coded audio data, and to achieve baseband audio data. The audio reproduction circuit 207 is, for example, a speaker, and is configured to output audio of the baseband audio data acquired by the audio decoding circuit 206.

The video decoding circuit 208 is configured to use the memory 209 as a work area to perform a decoding process on coded video data acquired from the audio separation circuit 205, and to acquire baseband (non-compressed) video data. The video display apparatus 210 is a liquid crystal display (LCD), an organic electro-luminescence (EL) panel, or the like, and is configured to display an image of baseband video data acquired by the video decoding circuit 208.

Figure 4:
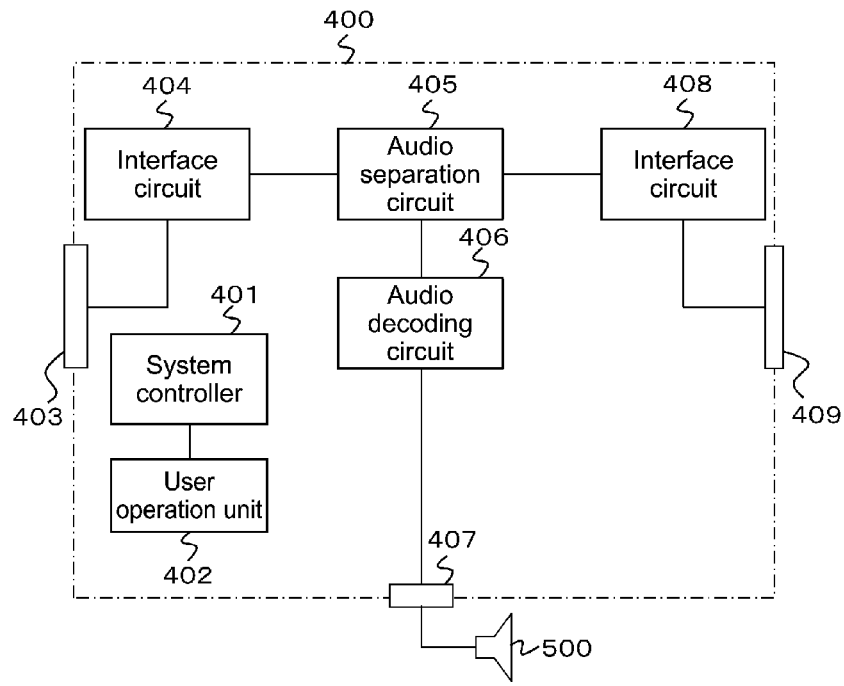
FIG. 4 is a block diagram showing a configuration example of a content repeater.

FIG. 4 shows a configuration example of the content repeater 400. The content repeater 400 includes a system controller 401, a user operation unit 402, an input port 403, an interface circuit 404, an audio separation circuit 405, an audio decoding circuit 406, an audio data output terminal 407, an interface circuit 408, and an output port 409.

The system controller 401 is configured to control the operation of each unit of the content repeater 400. The user operation unit 402 is connected to the system controller 401. The user operation unit 402 constitutes a user interface. The interface circuit 404 is configured to receive a signal for transmission (optical interface signal) input to the input port 403, and to convert the received optical signal into an electric signal.

The audio separation circuit 405 is configured to separate decoded audio data from the signal for transmission as necessary. The audio decoding circuit 406 is configured to perform a decoding process on the coded audio data, to acquire a baseband audio signal, and to transmit the signal to the audio data output terminal 407 to which a speaker 500 is connected. The interface circuit 408 is configured to convert an electric signal, i.e., a signal for transmission that passes through the audio separation circuit 405, into an optical signal, and to transmit the converted signal to the output port 409.

The system controller 101 of the content transmitter 100 is configured to acquire information on the cable length from the content transmitter 100 to the content receiver 200, and to control the operation of the interface circuit 109 serving as a transmission unit of content based on the cable-length information. The system controller 101 determines whether or not the content repeater 400 exists between the content transmitter 100 and the content receiver 200 by calculating the number of stages of apparatuses on a path based on the address.

The system controller 101 acquires information on the cable length from the cable 300 connected to the output port 110 in the case where the content repeater 400 does not exist between the content transmitter 100 and the content receiver 200 (see FIG. 1A). In this case, this information is the information on the cable length to the content receiver 200.

On the other hand, the system controller 101 acquires information on the cable length from the cable 301 connected to the output port 110, requests information on the cable length on the side of the content receiver 200 from each content repeater 400 to acquire the information, and acquires information on the cable length representing the sum of the cable lengths of the cables in the case where a predetermined number of content repeaters 400 exist between the content transmitter 100 and the content receiver 200 (see FIG. 1B, FIG. 1B shows the case of one content repeater 400). In this case, this information is the information on the cable length to the content receiver 200.

The plugs of the cables 300, 301, and 302 each include a memory in which the cable-length information is stored. The content transmitter 100 or the content repeater 400 acquires the cable-length information or the like from the memory. A configuration example for reading the cable-length information from the memory will be described, taking the connection part between the content transmitter 100 and the cable 300 as an example.

Figure 5:
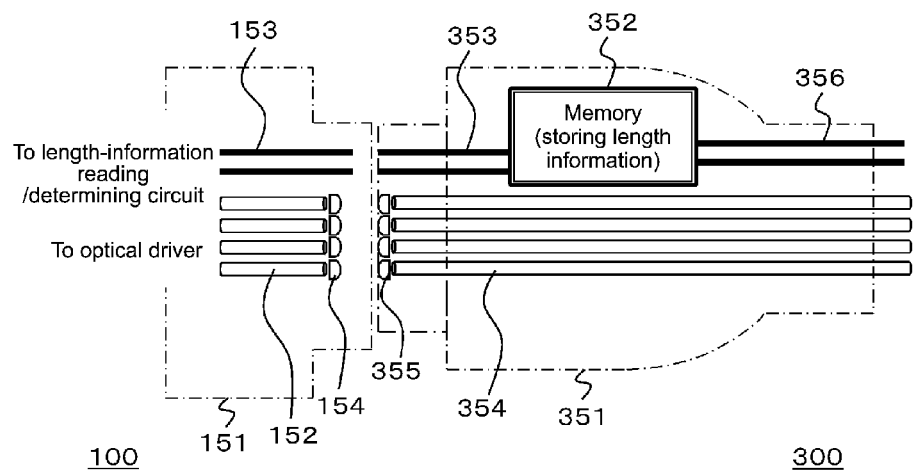
FIG. 5 is a diagram showing an example of a configuration for reading cable-length information from a memory.

FIG. 5 shows a configuration example for reading the cable-length information from the memory. The configurations of a plug 351 of the cable 300 and a receptacle 151 serving as the output port 110 of the content transmitter 100 are schematically shown. On the receptacle 151, a predetermined number of optical fibers 152 are arranged, and an electrical lead 153 is arranged. Each of the optical fibers 152 is configured to transmit a signal for transmission and extends from an optical driver. The electrical lead 153 is configured to read the cable-length information from the cable 300, and is connected to a length-information reading/determining circuit. It should be noted that in FIG. 5, the optical fibers are arranged in a line, but may be arranged in a two-dimensional arrangement, e.g., in a staggered arrangement.

On the other hand, the plug 351 includes a memory 352 that is configured to store the cable-length information or the like. To the memory 352, an electrical lead 353 that is configured to read the cable-length information is connected. From the tip portion of the electrical lead 353 is projected from the plug 351. Moreover, each of tip portions of a predetermined number of optical fibers 354 that are arranged in the cable 300 is projected from the plug 351.

When the plug 351 of the cable 300 is mounted on the receptacle 151 of the content transmitter 100, the end portion of the optical fiber 152 faces the end portion of the optical fiber 354. Accordingly, the signal for transmission from the optical driver (optical signal) is transmitted from the optical fiber 152 to the optical fiber 354, and then is transmitted to the reception side. It should be noted that collimate lenses 154 and 355 are provided on the tip portions of the optical fiber 152 and the optical fiber 354, respectively, and the signal is transmitted by parallel light.

Moreover, when the plug 351 of the cable 300 is mounted on the receptacle 151 of the content transmitter 100, the tip portion of the electrical lead 153 and the tip portion of the electrical lead 353 are in contact with each other, and are electrically connected to each other. Accordingly, the length information reading/determining circuit of the content transmitter 100 is capable of reading the cable-length information from the memory 352.

It should be noted that in the cable 300, an electrical lead 356 that is connected to the memory 352 as well as the optical fiber 354 extends over the side of another plug of the cable 300. Accordingly, also on the side of another plug, it is possible to read the cable-length information from the memory 352. Moreover, the memory 352 may be provided also to another end portion instead of the electrical lead 356. In these cases, a user can use the apparatus irrespective of the direction in which the cable 300 is inserted/ejected.

Figure 6:
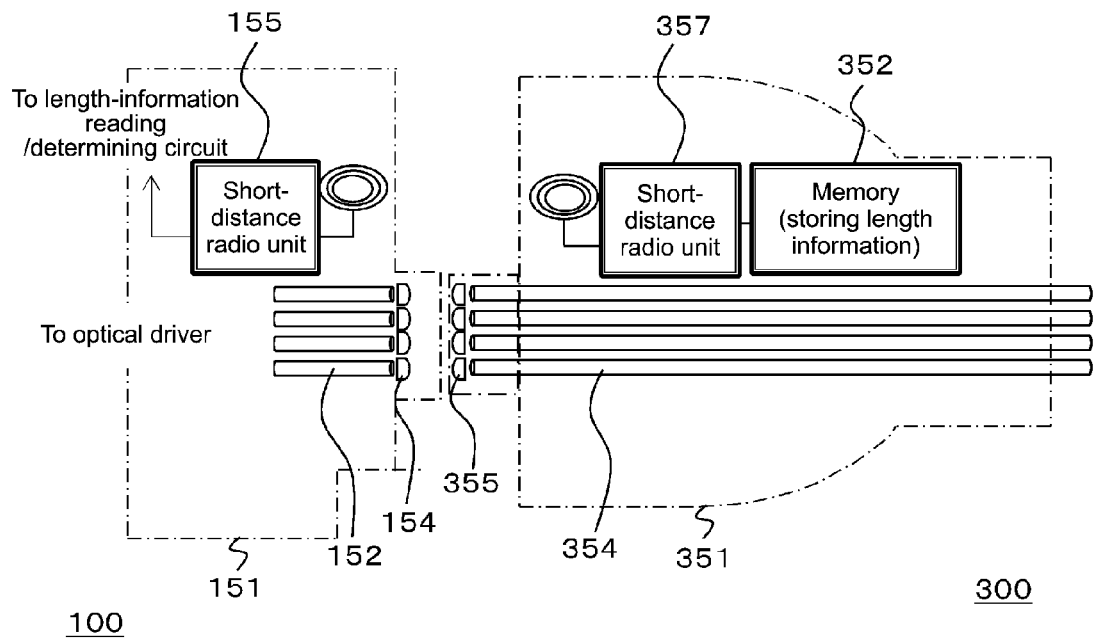
FIG. 6 is a diagram showing another example of the configuration for reading cable-length information from a memory.

FIG. 6 shows another configuration example for reading the cable-length information from the memory. The configurations of the plug 351 of the cable 300 and the receptacle 151 serving as the output port 110 of the content transmitter 100 are schematically shown. On the receptacle 151, a predetermined number of optical fibers 152 are arranged and a short-distance radio unit (short-distance radio module) 155 is arranged. Each of the optical fibers 152 is configured to transmit a signal for transmission and extends from the optical driver. The short-distance radio unit 155 is configured to read the cable-length information from the cable 300, and is connected to the length-information reading/determining circuit.

On the other hand, the plug 351 includes the memory 352 in which the cable-length information or the like is stored. To the memory 352, a short-distance radio unit (short-distance radio module) 357 that is configured to read the cable-length information is connected. Moreover, each of tip portions of the predetermined number of optical fibers 354 that are arranged in the cable 300 is projected from the plug 351.

When the plug 351 of the cable 300 is mounted on the receptacle 151 of the content transmitter 100, the end portion of the optical fiber 152 faces the end portion of the optical fiber 354. Accordingly, a signal for transmission (optical signal) from the optical driver is transmitted from the optical fiber 152 to the optical fiber 354, and is transmitted to the reception side. It should be noted that the collimate lenses 154 and 355 are provided on the tip portions of the optical fiber 152 and the optical fiber 354, respectively, and the signal is transmitted by parallel light.

Moreover, when the plug 351 of the cable 300 is mounted on the receptacle 151 of the content transmitter 100, the short-distance radio unit 155 and the short-distance radio unit 357 can communicate with each other wirelessly, and the length-information reading/determining circuit is capable of reading the cable-length information from the memory 352.

With this configuration, by providing the memory 352 and the short-distance radio unit 357 also to the side of another plug of the cable 300, a user can use the apparatus irrespective of the direction in which the cable 300 is inserted/ejected.

Figure 7:
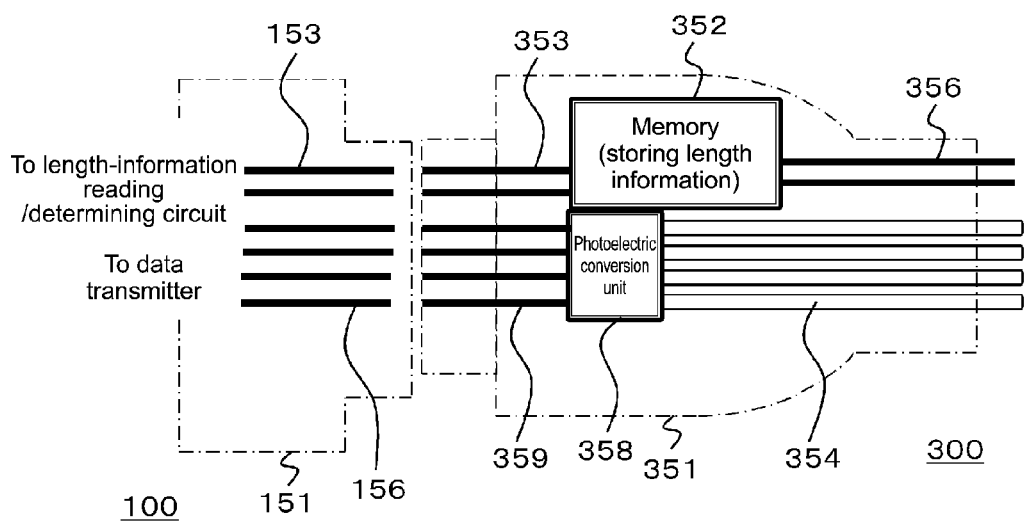
FIG. 7 is a diagram showing another example of the configuration for reading cable-length information from a memory.

FIG. 7 shows another configuration example for reading the cable-length information from the memory. The configurations of the plug 351 of the cable 300 and the receptacle 151 serving as the output port 110 of the content transmitter 100 are schematically shown. On the receptacle 151, a predetermined number of electrical leads 156 are arranged and the electrical lead 153 is arranged. Each of the electrical leads 156 is configured to transmit a signal for transmission and extends from a data transmitter. The electrical lead 153 is configured to read the cable-length information from the cable 300 and is connected to the length-information reading/determining circuit.

On the other hand, the plug 351 includes the memory 352 in which the cable-length information or the like is stored. To the memory 352, the electrical lead 353 that is configured to read the cable-length information is connected. The tip portion of the electrical lead 353 is projected from the plug 351. Moreover, the predetermined number of optical fibers 354 that are arranged in the cable 300 are connected to a photoelectric conversion unit 358, and a predetermined number of electrical leads 359 are connected to the photoelectric conversion unit 358. Each tip portion of the electrical leads 359 is projected from the plug 351.

When the plug 351 of the cable 300 is mounted on the receptacle 151 of the content transmitter 100, the tip portion of the electrical lead 156 and the tip portion of the electrical lead 359 are in contact with each other and are electrically connected to each other. Accordingly, a signal for transmission (electric signal) from the data transmitter is transmitted to the photoelectric conversion unit 358 through the electrical leads 156 and 359, and is converted into an optical signal. The signal is transmitted to the optical fiber 354, and is transmitted to the reception side as an optical signal.

Moreover, when the plug 351 of the cable 300 is mounted on the receptacle 151 of the content transmitter 100, the tip portion of the electrical lead 153 and the tip portion of the electrical lead 353 are in contact with each other and are electrically connected with each other. Accordingly, the length-information reading/determining circuit of the content transmitter 100 is capable of reading the cable-length information from the memory 352.

In this configuration example, all of the contact portions in the connector are electrically connected, and a part of them includes connection that can access the memory 352. Because no optical connection is included, the configurations of the receptacle 151 and the plug 351 are simple.

It should be noted that in the cable 300, the electrical lead 356 that is connected to the memory 352 as well as the optical fiber 354 extends over the side of another plug of the cable 300. Accordingly, also on the side of another plug, it is possible to read the cable-length information from the memory 352. Moreover, the memory 352 may be provided to the side of another end portion instead of the electrical lead 356.

Alternatively, the electrical lead 356 may be connected to the photoelectric conversion unit 358, and a signal may be transmitted to another end portion through an optical fiber and may be photoelectrically converted again on the other end portion similarly as the case of another signal unit. In these cases, a user can use the apparatus irrespective of the direction in which the cable 300 is inserted/ejected. It should be noted that in FIG. 7, the optical fibers are arranged in a line, but may be arranged in a two-dimensional arrangement, e.g., in a staggered arrangement.

It should be noted that the configuration examples shown in FIG. 5 to FIG. 7 show the connection portion between the content transmitter 100 and the cable 300. Although a detailed description is omitted, the connection portion between the content repeater 400 and the cable 302 is configured similarly, and the length-information reading/determining circuit of the content repeater 400 is capable of reading the cable-length information from the memory 352.

FIG. 8 shows an example of information stored in the memory 352. In the memory 352, 1 byte of information related to the cable-length information exists. The 1 byte of information is formed of the cable-length information represented by 7 bits from the 0th bit to the 6th bit and flag information of the 7th bit, which represents the existence or non-existence of code. The flag information of "1" represents that an encryption process is performed on the cable-length information.

Moreover, in the memory 352, public key data for decoding the encrypted cable-length information exists. In addition, in the memory 352, signature data exists. In the case where the cable-length information is falsified, the signature data is used to detect the falsification. It should be noted that in the example shown in FIG. 8, an encryption process is performed on the cable-length information, and the public key data and the signature data exist. Although not shown, in the case where an encryption process is not performed on the cable-length information, no public key data or signature data exists.

The system controller 101 of the content transmitter 100 limits the transmission of content from the interface circuit 109 serving as the transmission unit of content when the cable-length information is not acquired or when the cable length represented by the cable-length information exceeds the distance limit. For example, examples of the case where the cable-length information is not acquired include the case where the cable 300 (301, 302) includes no memory 352 that stores the cable-length information or the like. Moreover, examples of the case where the cable-length information is not acquired include the case where the signature data has been used to detect the falsification of the cable-length information.

The distance limit is included in content as one of copyright protection information, for example. As the copyright protection information, information of instructing number of times of copy (Copy Once, No more Copy, Copy Never, etc.), limitation of the cable length applied in the embodiment of the present disclosure, information used for encryption (public key information, signature information), or the like is stored in each content. For example, the information may be stored in a particular area in the case of disc media. Moreover, in the case of broadcast waves or the Internet content, for example, the information may be stored in the area such as a header in the container of the compression format of the content itself. Moreover, the information may be separately transmitted as reproduction acceptance information in another file or metadata. Moreover, the distance limit is set by a user, e.g., under parental control.

The system controller 101 is configured to control the interface circuit 109 not to transmit content (signal for transmission corresponding to the content) to limit the transmission of content. Alternatively, the system controller 101 controls the interface circuit 109 to transmit content with decreased quality (signal for transmission corresponding to the content) to limit the transmission of content.

It should be noted that in the case where the transmission of content is stopped, it may be possible to cause a user to want to change the connection state to a proper connection state, by stopping the transmission of content after content is transmitted for a certain time period, e.g., 5 minutes. Moreover, in the case where content with decreased quality is transmitted, it may be possible to cause a user to want to change the connection state to a proper connection state, by converting the signal into a monaural signal or reducing the number of quantization bits to decrease the quality of audio as well as decreasing the quality of image, for example.

In the case where the transmission of content is limited, as described above, the interface circuit 109 may transmit, to the content receiver 200, image data for informing that the transmission of the content is limited. FIG. 9 shows an example of the informing screen. This example shows the case where the transmission of content (signal for transmission corresponding to the content) is not performed. It should be noted that the informing screen is not limited thereto, and is different depending on the limitation.

Figure 10:
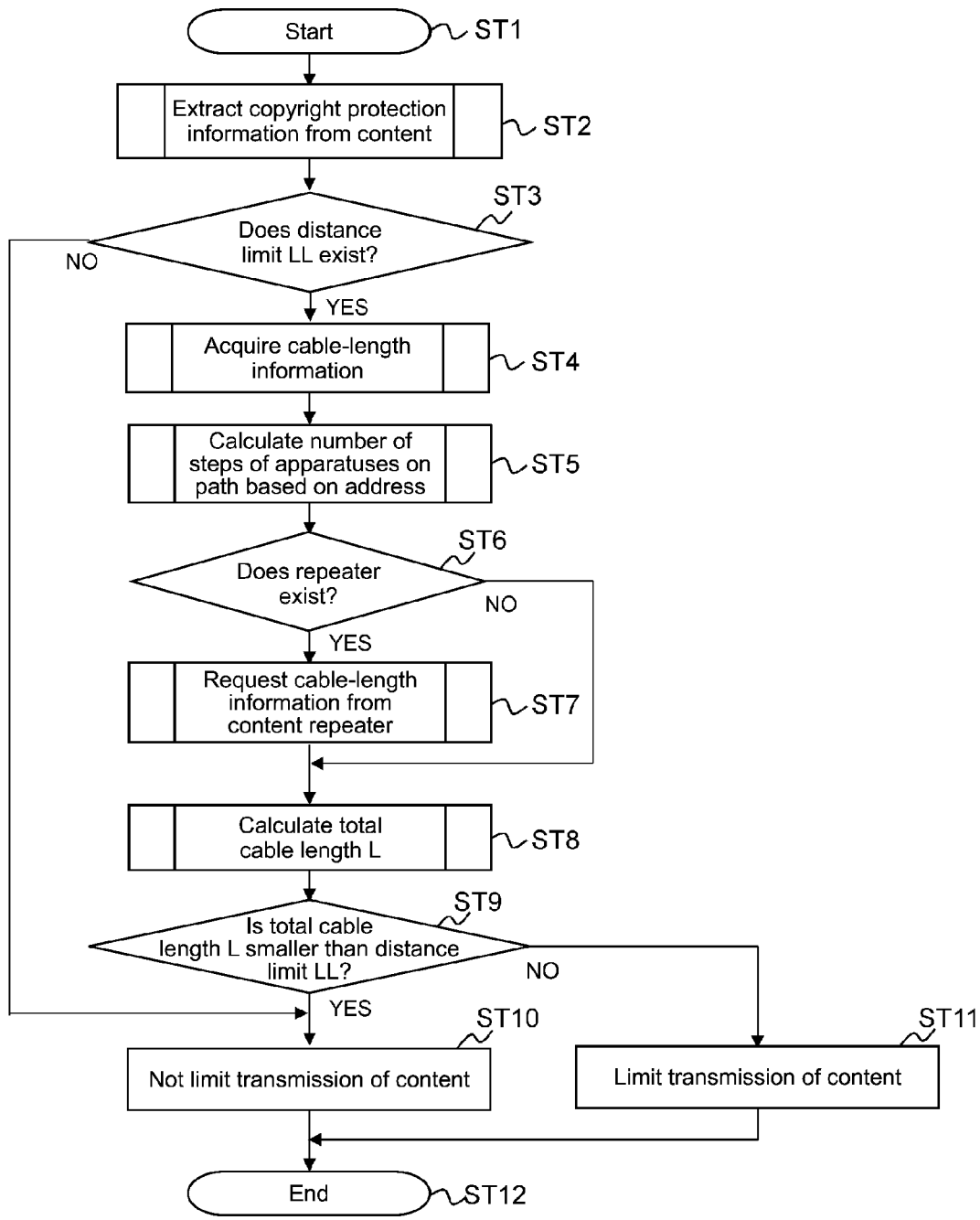
FIG. 10 is a flowchart showing an example of process procedure according to the limitation of content transmission performed by a system controller of a content transmitter.

The flowchart of FIG. 10 shows an example of the process procedure according to the limitation of content transmission performed by the system controller 101 of the content transmitter 100. The system controller 101 starts a process in Step ST1. After that, the system controller 101 extracts copyright protection information from content in Step ST2.

Next, the system controller 101 determines whether or not a distance limit LL exists, in Step ST3. In the case where the distance limit LL exists, the system controller 101 acquires the cable-length information from a cable connected to the content transmitter 100, in Step ST4.

Next, the system controller 101 calculates the number of steps of apparatuses on a path from the content transmitter 100 to the content receiver 200 based on the address. Then, the system controller 101 determines whether or not the content repeater 400 exists on the path from the content transmitter 100 to the content receiver 200 based on the calculation results obtained in Step ST5, in Step ST6.

In the case where the content repeater 400 exists, the system controller 101 requests the cable-length information from each content repeater 400. In this case, the system controller 101 requests each content repeater 400 to acquire the cable-length information of the cables connected to the downstream side of itself and to inform the information. After that, the system controller 101 performs a process in Step ST8. In the case where no content repeater 400 exists in Step ST6, the system controller 101 performs the process in Step ST8. In Step ST8, the system controller 101 calculates a total cable length L.

It should be noted that in the case where no content repeater 400 exists on the path from the content transmitter 100 to the content receiver 200, the cable length represented by the cable-length information acquired in Step ST4 is the total cable length L. On the other hand, in the case where the content repeater 400 exists on the path from the content transmitter 100 to the content receiver 200, the cable length represented by each cable-length information acquired in Step ST7 is added to the cable length represented by the cable-length information acquired in Step ST4, and the thus-obtained cable length is used as the total cable length L.

It should be noted that in the case where no the cable-length information is acquired in Step ST4 or where no cable-length information is acquired from the content repeater 400 in Step ST7, the system controller 101 regards the total cable length L as being infinite for the sake of convenience and performs the following process.

Next, the system controller 101 determines whether or not the total cable length L is smaller than the distance limit LL, in Step ST9. In the case where the total cable length L is smaller than the distance limit LL, the system controller 101 does not limit the transmission of content, in Sep ST10. After that, the system controller 101 finishes the process, in Step ST12. On the other hand, in the case where the total cable length L is not smaller than the distance limit LL, the system controller 101 limits the transmission of content in Step ST11. After that, the system controller 101 finishes the process in Step ST12.

Moreover, in the case where the copyright protection information includes no distance limit LL in Step ST3, the system controller 101 immediately performs the process of Step ST10 and does not limit the transmission of content. After that, the system controller 101 finishes the process, in Step ST12.

Figure 11:
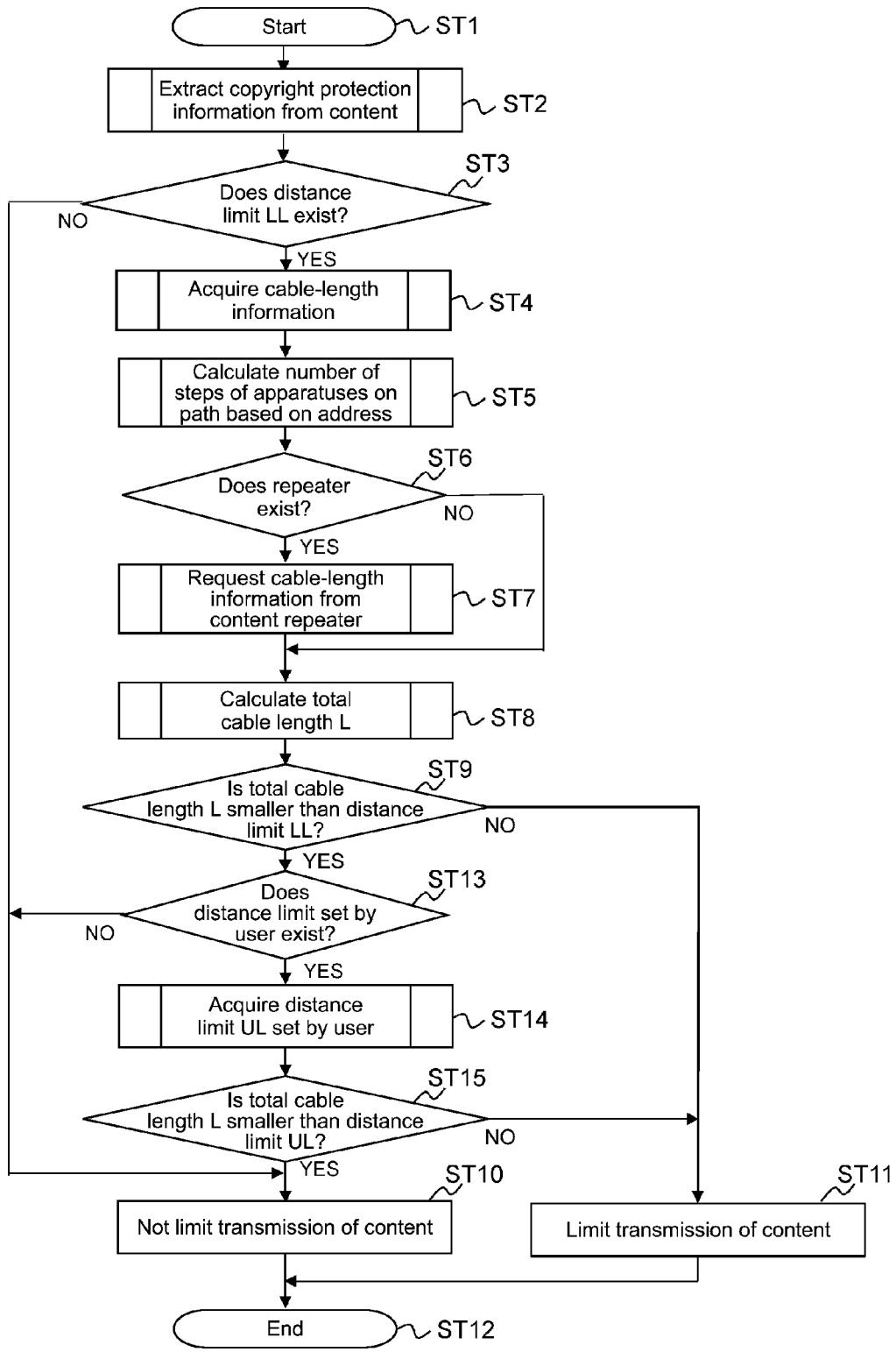
FIG. 11 is a flowchart showing another example of the process procedure according to the limitation of content transmission by a system controller of a content transmitter.

The flowchart of FIG. 11 shows another example of the process procedure according to the limitation of content transmission performed by the system controller 101 of the content transmitter 100. In the above-mentioned flowchart of FIG. 10, only the distance limit LL included in content as one of copyright protection information is used. However, in the flowchart of FIG. 11, also a distance limit UL set by a user is used. In the flowchart of FIG. 11, the steps corresponding to those shown in the flowchart of FIG. 10 will be denoted by the same reference symbols and a detailed description thereof will be omitted as appropriate.

In the flowchart of FIG. 11, the steps from Step ST1 to Step ST9 are the same as those shown in the flowchart of FIG. 10. In the case where the total cable length L is smaller than the distance limit LL in Step ST9, the system controller 101 performs the process of Step ST13. In Step ST13, the system controller 101 determines whether or not a distance limit set by a user exists.

In the case where no distance limit set by a user exists, the system controller 101 performs the process of Step ST10 immediately, and does not limit the transmission of content. After that, the system controller 101 finishes the process, in Step ST12. On the other hand, in the case where a distance limit set by a user exists, the system controller 101 acquires the distance limit UL set by a user, in Step ST14.

Next, the system controller 101 determines whether or not the total cable length L is smaller than the distance limit UL, in Step ST15. In the case where the total cable length L is smaller than the distance limit UL, the system controller 101 does not limit the transmission of content, in Step ST10. After that, the system controller 101 finishes the process, in Step ST12. On the other hand, in the case where the total cable length L is not smaller than the distance limit UL, the system controller 101 limits the transmission, of content in ST11. After that, the system controller 101 finishes the process, in Step ST12.

The processes of other steps are the same as those shown in the flowchart of FIG. 10. The function of limiting transmission of content by the distance limit UL set by a user is typically meaningful in the case where the distance limit LL by content is smaller than the distance limit UL set by a user.

As described above, in the content transmission systems 10A and 10B shown in FIG. 1, the content transmitter 100 acquires the cable-length information to the content receiver 200, and controls the operation of transmitting content based on the acquired cable-length information. For example, it is possible to easily and reliably achieve the copyright protection of content that can be transmitted only for family use, for example.

Moreover, in the content transmission systems 10A and 10B shown in FIG. 1, the content transmitter 100 limits the transmission of content based on the sum of lengths of cables in the case where the content repeater 400 exists between the content transmitter 100 and the content receiver 200. By connecting the content repeater 400 between the content transmitter 100 and the content receiver 200, it is possible to limit the transmission distance within a certain distance to protect the copyright even when the transmission distance is desired to be prolonged.

Moreover, in the content transmission systems 10A and 10B shown in FIG. 1, the cables 300, 301, and 302 each include a memory whose plug having the cable-length information stored therein. For example, in a transmission apparatus used with this cable connected thereto, it is possible to easily acquire the cable-length information, and to easily and reliably achieve copyright protection of content that can be transmitted only for family use based on the acquired cable-length information.

(2. Modified Example)

It should be noted that in the above-mentioned embodiment, the cable-length information is used to limit the transmission of content. However, the cable-length information can be used to accept/reject copying. For example, in connection of a distance shorter than a certain distance, it is possible to permit relaxing of copy limitation (e.g., number of times of copy acceptance and copy prohibition information) because it can be considered that the content transmitter and the content receiver coexist in a room and content can be reproduced in the apparatuses within the area.

It should be noted that the present disclosure may also take the following configurations.

(1) A transmission apparatus, including:
   a transmission unit configured to transmit content to an external apparatus through a cable;
   an information acquisition unit configured to acquire cable-length information that represents a cable length to the external apparatus; and
   a controller configured to control an operation of the transmission unit based on the cable-length information acquired by the information acquisition unit.

(2) The transmission apparatus according to (1) above, in which
   the controller is configured to limit transmission of the content from the transmission unit when the cable-length information is not acquired by the information acquisition unit or when the cable length indicated by the cable-length information acquired by the information acquisition unit exceeds a distance limit.

(3) The transmission apparatus according to (2) above, in which
   the distance limit is included in the content as one of copyright protection information.

(4) The transmission apparatus according to (2) or (3) above, in which
   the distance limit is set by a user.

(5) The transmission apparatus according to any one of (2) to (4) above, in which
   the controller is configured to control the transmission unit not to transmit the content when the cable-length information is not acquired by the information acquisition unit or when the cable length indicated by the cable-length information acquired by the information acquisition unit exceeds the distance limit.

(6) The transmission apparatus according to any one of (2) to (4) above, in which
   the controller is configured to control the transmission unit to transmit content with decreased quality when the cable-length information is not acquired by the information acquisition unit or when the cable length indicated by the cable-length information acquired by the information acquisition unit exceeds the distance limit.

(7) The transmission apparatus according to any one of (2) to 6) above, in which
   the transmission unit is configured to transmit image data to the external apparatus through the cable when the transmission of the content is limited, the image data informing that the transmission of the content is limited.

(8) The transmission apparatus according to any one of (1) to (7) above, in which
   the information acquisition unit is configured to acquire cable-length information that represents a sum of cable lengths of cables in a case where a predetermined number of repeaters exist between the transmission apparatus and the external apparatus.

(9) The transmission apparatus according to (8) above, in which
   the information acquisition unit is configured to acquire the cable-length information that represents the sum of the cable lengths of the cables by requesting cable-length information that represents a cable length on a side of the external apparatus from each of the predetermined number of repeaters to acquire the requested cable-length information.

(10) The transmission apparatus according to (9) above, in which
   the information acquisition unit is configured
      to calculate the number of apparatuses on a path based on an address, and
      to determine whether or not a repeater exists between the transmission apparatus and the external apparatus.

(11) A transmission method, including:
  transmitting, by a transmission unit, content to an external apparatus through a cable;
  acquiring cable-length information that represents a cable length to the external apparatus; and
  controlling an operation of the transmitting of the content based on the cable-length information acquired in the acquiring of the cable-length information.
(12) A cable, including
  a memory including a plug having cable-length information stored therein.
(13) The cable according to (12) above, in which the cable-length information stored in the memory is encrypted, and
  the memory further stores public key information for decrypting the cable-length information.
(14) The cable according to (12) or (13) above, in which information stored in the memory can be taken out through an electrical lead.
(15) The cable according to (12) or (13) above, in which information stored in the memory can be taken out through wireless communication.

It should be understood by those skilled in the art that various modifications, combinations, sub-combinations and alterations may occur depending on design requirements and other factors insofar as they are within the scope of the appended claims or the equivalents thereof.

What is claimed is:

1. A transmission apparatus, comprising:
  a transmission unit configured to transmit content to an external apparatus through a cable;
  an information acquisition unit configured to acquire, from a memory included in the cable, first cable-length information that represents a length of the cable from the transmission apparatus to the external apparatus, wherein the first cable-length information is acquired based on a distance limit that is included in a copyright protection information of the content, and
  a controller configured to:
    compare the distance limit extracted from the copyright protection information of the content with the length of the cable; and
    control an operation of a circuit, which is configured to convert an electrical signal into an optical signal for the transmission, based on the comparison.

2. The transmission apparatus according to claim 1, wherein the controller is further configured to limit the transmission of the content from the transmission unit based on inability to acquire the first cable-length information or based on a determination that the length of the cable indicated by the first cable-length information exceeds the distance limit.

3. The transmission apparatus according to claim 1, wherein the distance limit is set by a user.

4. The transmission apparatus according to claim 1, wherein the controller is further configured to control the transmission unit to prevent the transmission of the content based on inability to acquire the first cable-length information or based on a determination that the length of the cable indicated by the first cable-length information exceeds the distance limit.

5. The transmission apparatus according to claim 1, wherein the controller is further configured to control the transmission unit to transmit the content with decreased quality based on inability to acquire the first cable-length information or based on a determination that the length of the cable indicated by the first cable-length information exceeds the distance limit.

6. The transmission apparatus according to claim 2, wherein the transmission unit is further configured to transmit image data to the external apparatus through the cable based on a determination that the transmission of the content is limited, wherein the image data indicates that the transmission of the content is limited.

7. The transmission apparatus according to claim 1, wherein the information acquisition unit is further configured to acquire second cable-length information based on an existence of a determined number of repeaters between the transmission apparatus and the external apparatus, wherein the second cable-length information represents a sum of lengths of a plurality of cables.

8. The transmission apparatus according to claim 7,
  wherein the information acquisition unit is further configured to acquire the second cable-length information based on a request for the second cable-length information, and
  wherein the second cable-length information further represents a length of each cable of the plurality of cables associated with each of the determined number of repeaters.

9. The transmission apparatus according to claim 1, wherein the information acquisition unit is further configured to:
  calculate a number of apparatuses on a path between the transmission apparatus and the external apparatus based on an address; and
  determine that a repeater exists between the transmission apparatus and the external apparatus.

10. The transmission apparatus according to claim 1, wherein the copyright protection information further indicates at least a number of times a copy operation on the content is permitted.

11. A transmission method, comprising:
  in a transmission apparatus:
    transmitting, by a transmission unit, content to an external apparatus through a cable;
    acquiring, from a memory included in the cable, cable-length information that represents a length of the cable from the transmission apparatus to the external apparatus, wherein the cable-length information is acquired based on a distance limit that is included in a copyright protection information of the content;
    comparing the distance limit extracted from the copyright protection information of the content with the length of the cable; and
    controlling an operation of a circuit, which is configured to convert an electrical signal into an optical signal for the transmission, based on the comparison.

* * * * *